United States Patent
Tse et al.

(10) Patent No.: US 10,075,424 B2
(45) Date of Patent: Sep. 11, 2018

(54) APPLICATION AUTHENTICATION WRAPPER

(71) Applicant: AirWatch LLC, Atlanta, GA (US)

(72) Inventors: Kar Fai Tse, Peachtree Corners, GA (US); Chen Lu, Sandy Springs, GA (US); Erich Stuntebeck, Marietta, GA (US)

(73) Assignee: AIRWATCH LLC, Atlanta, GA (US)

( * ) Notice: Subject to any disclaimer, the term of this patent is extended or adjusted under 35 U.S.C. 154(b) by 193 days.

(21) Appl. No.: 15/082,070

(22) Filed: Mar. 28, 2016

(65) Prior Publication Data
US 2017/0279792 A1  Sep. 28, 2017

(51) Int. Cl.
*H04L 29/06* (2006.01)

(52) U.S. Cl.
CPC ...... *H04L 63/0807* (2013.01); *H04L 63/0428* (2013.01); *H04L 63/062* (2013.01); *H04L 63/0884* (2013.01); *H04L 63/166* (2013.01)

(58) Field of Classification Search
CPC .............................. G06F 21/44; H04L 63/0807
See application file for complete search history.

(56) References Cited

U.S. PATENT DOCUMENTS

| | | | | |
|---|---|---|---|---|
| 2002/0147927 A1* | 10/2002 | Tait | ....................... | H04L 63/029 726/10 |
| 2013/0163758 A1* | 6/2013 | Swaminathan | ....... | H04L 9/0819 380/259 |
| 2013/0227291 A1* | 8/2013 | Ahmed | ............... | H04L 63/0281 713/171 |
| 2013/0269019 A1* | 10/2013 | Garmark | ................... | G06F 9/54 726/9 |
| 2015/0215128 A1* | 7/2015 | Pal | ....................... | H04L 9/3228 713/155 |

* cited by examiner

*Primary Examiner* — David J Pearson
(74) *Attorney, Agent, or Firm* — Thomas Horstemeyer, LLP

(57) ABSTRACT

Disclosed are various approaches for implementing an application authentication wrapper. An authentication request, such as a Kerberos request, is created for authenticating the computing device. The authentication request is encrypted to generate an encrypted authentication request. The encrypted authentication request is then forwarded to a reverse proxy server. An encrypted authentication response is received from the reverse proxy server. The encrypted authentication response, such as a Kerberos response, is then decrypted to generate a corresponding authentication response, which is then forwarded to the computing device that generated the authentication request.

20 Claims, 4 Drawing Sheets

100

APPLICATION AUTHENTICATION WRAPPER

BACKGROUND

Mobile device operating systems, such as Apple's iOS or Google's Android operating system, provide a Kerberos framework. This Kerberos framework allows for applications executing on the mobile device to use Kerberos for authentication of the mobile device or authentication of a user of the mobile device. However, Kerberos requires that a client communicate directly with a Key Distribution Center (KDC) for authentication. In order for mobile devices operating external to the KDC's network to authenticate using Kerberos (for example, a mobile device connecting across the public internet to a corporate network hosting the KDC), mobile devices are often required to first connect to the KDC's network through a virtual private network (VPN) connection. This allows for secure communications between external mobile devices and the KDC without having to make the KDC directly accessible to external devices.

VPNs have a number of benefits and drawbacks. VPNs offer a highly secure channel between two networks or between a mobile device and network the mobile device wishes to access. However, the processing required to encrypt the request traveling over the VPN connection often reduces the available bandwidth as the router and/or VPN server encrypts and decrypts individual network packets. Moreover, VPN connections can be unreliable. For example, a coffee shop might block commonly used ports related to Internet Protocol security extensions (IPSec) or commonly used ports related to popular secure sockets layer (SSL) VPN implementations.

Further, the use of VPNs by mobile applications can be constrained by the operating system. For example, many mobile devices limit or otherwise restrict the execution of or functionality of background processes (including VPNs). These restrictions are intended to preserve the battery life of a mobile device by limiting the execution of background processes and, therefore, the use of computing resource that would drain the battery.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for providing an application authentication wrapper for various mobile devices. An authentication request originating from a client device, such as Kerberos protocol request, is redirected through a listener application executing on the client device. The listener application can encrypt the authentication request and relay it to a proxy server. The proxy server can then decrypt the authentication request and relay it to an authentication server. In response, the authentication server can generate a response, which can include an approval or denial of the authentication request. The authentication server then sends the response to the proxy server, which encrypts the response and forwards it to the listener application on the client device. The listener application decrypts the response and returns it to the client application that initiated the authentication request.

Figure 1:
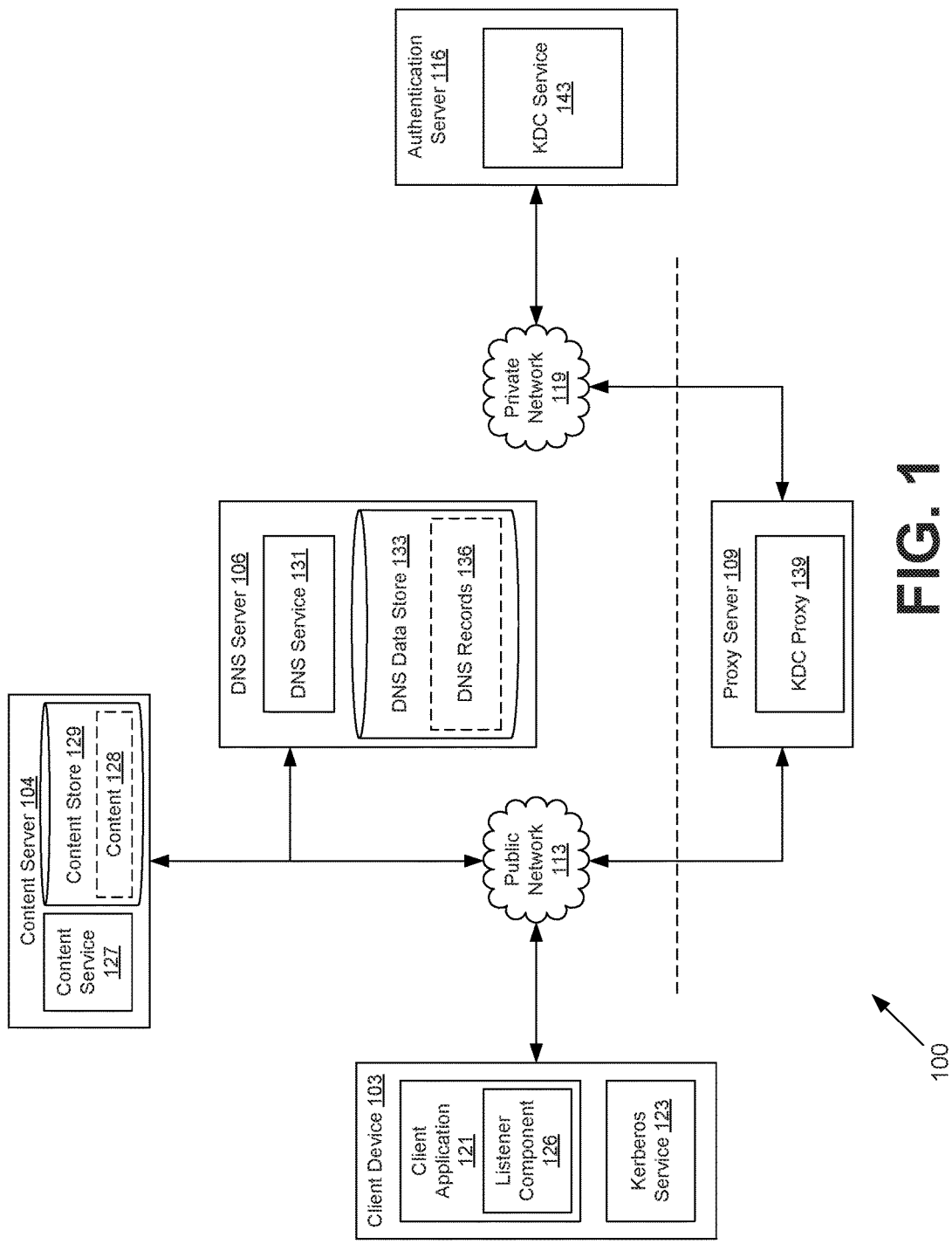
FIG. 1 is a schematic block diagram of a network environment.

FIG. 1 depicts a schematic block diagram of a networking environment 100 according to various examples of the present disclosure. The networked environment 100 includes a client device 103, which is in data communication with a content server 104, a domain name system (DNS) Server 106, and a proxy server 109 through a public network 113. The public network 113 includes the Internet, some publicly accessible private networks or intranets (for example, wireless "hotspots" at coffee shops, libraries, malls, and similar public spaces), extranets, wide area networks (WANs), publicly accessible local area networks (LANs), wired networks, wireless networks, or other suitable networks, etc., or any combination of two or more networks. For example, the public network 113 can include satellite networks, cable networks, Ethernet networks, and other types of networks. The proxy server 109 is also in data communication with an authentication server 116 through a private network 119. The private network 119 can include a virtual private network (VPN) connection across publicly available networks, such as the Internet, or various privately accessible LANs, intranets, wireless networks, wired networks, or similar networks that are not accessible to externally located computing devices. Due to the position of the proxy server 109 between the public network 113 and the private network 119, the proxy server 109 serves to separate or firewall the private network 119 from the public network 113, as indicated by the dotted line.

The client device 103 is representative of a plurality of client devices 103 that can be coupled to the public network 113. The client device 103 can include a processor-based system, such as a computer system. The computer system can include a desktop computer, a laptop computer, a personal digital assistant, a cellular telephone, a smartphone, a set-top box, a music player, a web pad, a tablet computer system, a game console, an electronic book reader, a wearable computing device, an augmented reality or virtual reality device, or another device with like capability.

The client device 103 can execute various applications such as a client application 121, a Kerberos service 123, a listener component 126, or other applications. The client application 121 can include various types of applications configured to communicate with the content service 127. For example, the client application 121 could include a web browser, an email application, or other network applications. The Kerberos service 123 includes a service or application configured to authenticate the client device 103 using a version of the Kerberos protocol. In some instances, the functionality of the Kerberos service 123 can be provided by an operating system of the client device 103. In other instances, the Kerberos service 123 can include a standalone service or application independent of the operating system. The listener component 126 is executed to receive or intercept authentication traffic, such as Kerberos traffic, destined for the authentication server 116, and redirect it to the proxy server 109. In some instances, the listener component 126 is a component of the client application 121 executing on the client device 103. For example, the listener component 126 could include a library that is linked to or otherwise incorporated into the client application 121. In these instances, the Kerberos service 123 and the listener component 126 could communicate without requiring the use of a separate process executing in the background. However, in other instances, the listener component 126 could include an independent application executing as a background process or service.

The content server 104 corresponds to a computing device that generates, provides, or otherwise sends content in response to a request from a client device 103. The content server 104 can include a computing device, such as a server, or multiple computing devices working together, such as a server bank, server farm, or similar computing environment. In some instances, the content server 104 can correspond to a virtualized computing device, such as a virtual server or similar resource running in a virtualized computing environment and managed by a hypervisor or similar application.

The content server 104 can be configured to execute a content service 127. The content service 127 can be configured to receive a request for content 128 located in a content store 129 and provide the content 128 in response. For example, the content service 127 could include web server configured to receive requests for web pages, process the requests, and provide a web page in response. As another example, the content service 127 could include a media server configured to receive a request for video or audio media and stream the media in response. In other examples, the content service 127 could include an email server configured to receive a request for emails and provide copies of the emails in response.

The content store 129 can include one or more data stores. These data stores can include files stored in a filesystem, relational databases, key-value data stores, or other types of data repositories. The content 128 stored in the content store 129 can include any content that might be requested by a client application 121. For example, the content 128 can include web pages, images, videos, audio, documents, or other files.

The DNS server 106 is representative of one or more computing devices configured to act as a server. The DNS server 106 can include a processor-based system, such as a computing device, or a virtualized instance of a processor-based system executing as a virtual machine in a hosted environment. In some instances, the DNS server 106 is representative of a plurality of DNS servers 106, such as mirrored servers or a cluster of servers that respond to requests in a round-robin or similar fashion.

The DNS server 106 can be configured to execute a DNS service 131. The DNS service 131 is executed to provide an internet protocol (IP) address in response to a request containing a fully-qualified domain name (for example, www.example.com or mail.example.com). For example, the DNS service 131 can query a DNS data store 133 to retrieve a DNS record 136 stored in the DNS data store 133. The DNS data store 133 can be representative of a plurality of DNS data stores 133, as can be appreciated. The DNS record 136 can be representative of a mapping between the fully-qualified domain name and a corresponding IP address (for example, a DNS A record of a DNS AAAA record), a mapping between the fully-qualified domain name and an alias for the fully-qualified domain name (for example, a DNS CNAME record), as well as other mappings.

The proxy server 109 is representative of one or more computing devices configured to act as a server. The proxy server 109 can include a processor-based system, such as a computing device, or a virtualized instance of a processor-based system executing as a virtual machine in a hosted environment. In some instances, the proxy server 109 is representative of a plurality of proxy servers 109, such as mirrored servers or a cluster of servers that respond to requests in a round-robin or similar fashion.

The proxy server 109 can be configured to execute a Key Distribution Center (KDC) proxy 139. The KDC proxy 139 can be executed to act as an intermediary on behalf of the KDC service 143. Accordingly, the KDC proxy 139 can be configured as a reverse proxy server. In such instances, the KDC proxy 139 can receive Kerberos authentication requests to the KDC service 143 from a listener component 126 executing on one or more client devices 103. The KDC proxy 139 can then forward the received Kerberos authentication requests to the KDC service 143 and can relay responses from the KDC service 143 to the corresponding listener component 126.

The authentication server 116 is representative of one or more computing devices configured to act as a server. The authentication server 116 can include a processor-based system, such as a computing device, or a virtualized instance of a processor-based system executing as a virtual machine in a hosted environment. In some instances, the authentication server 116 is representative of a plurality of authentication servers 116, such as mirrored servers or a cluster of servers that respond to requests in a round-robin or similar fashion.

The authentication server 116 can be configured to execute an authentication service, such as a KDC service 143 for authenticating clients according to a version of the Kerberos protocol. The KDC service 143 can be configured to issue a ticket-granting ticket, which is time-stamped, and encrypt it using the credentials supplied by the requesting client device 103. The ticket-granting ticket can be used by the client device 103 to authenticate with other servers or applications that implement the Kerberos protocol.

Next, a general description of the operation of the various components of the networking environment 100 is provided. To begin, the client application 121 sends a request for content 128 to the content service 127 executing on the content server 104. In response, the content service 127 sends a request to the client application 121 for a Kerberos token in order to authenticate the client application 121. Then, a Kerberos service 123 attempts to connect to the KDC service 143 to obtain authentication credentials. The Kerberos service 123 can send a DNS request containing the domain name of the authentication server 116 hosting the KDC service 143 to a DNS service 131. In some instances, the domain name can include the fully-qualified domain name of the authentication server 116 (e.g., server.example.com). In these instances, the DNS service 131 responds to the query with the IP address stored in the DNS record 136 associated with the fully-qualified domain name. In other instances, the domain name can include just the base domain name of the authentication server 116 (e.g., example.com). In these instances, the DNS service 131 responds to the query with the IP address of the requested service for the base domain, which may be stored in the DNS record 136 associated with the base domain name.

Traditionally, the DNS record 136 for the fully-qualified domain name of the authentication server 116 executing the KDC service 143 would contain the publicly facing IP address of the authentication server 116. However, in various instances of the present disclosure, the DNS record 136 for the fully-qualified domain name of the authentication server 116 includes either the localhost IP address (for example, 127.0.0.1) or the public IP address of the client device 103. The DNS service 131 therefore sends a DNS response containing the localhost IP address or the public IP address of the client device 103, which causes the Kerberos service 123 to send an authentication request to the client device 103 executing the Kerberos service 123 instead of the authentication server 116 executing the KDC service 143.

As a result, a listener component 126 executing on the client device 103 can receive an authentication request and authentication credentials from the Kerberos service 123. In instances where the listener component 126 is configured to receive Kerberos traffic, the listener component 126 can be configured to listen on port 88 for universal datagram protocol (UDP) requests corresponding to the Kerberos authentication request sent by the Kerberos service 123. In such instances, the listener component 126 imitates the KDC service 143 by accepting the Kerberos authentication request.

The listener component 126 can then process and forward the Kerberos authentication request to a KDC proxy 139 executing on the proxy server 109. The listener component 126 can be preconfigured with the location of the proxy server 109 executing the KDC proxy 139, for example, through the use of a profile setting for a profile installed on the client device 103. In such instances, the profile can be installed and configured by a management service. The management service can administer the operation of devices, such as the client device 103, registered or otherwise enrolled with the management service. To this end, the management service can push a profile to the client device 103. The profile can specify that applications specified in the profile to be configured in a manner specified in the profile. For example, the profile could include a value for an application setting, such as the location or address of the KDC proxy 139 to be used by the listener component 126.

To process the Kerberos authentication request, the listener component 126 can, in some instances, wrap the Kerberos authentication request within a transmission control protocol (TCP) stream and a hypertext transport protocol (HTTP) request. For example, the listener component 126 could construct a TCP stream that includes the data included in the Kerberos authentication request instead of sending the Kerberos authentication request using a universal datagram protocol (UDP) packet as described in the Kerberos specification. As another example, the listener component 126 could include the Kerberos authentication request within the body of an HTTP request.

The listener component 126 can then encrypt the wrapped Kerberos authentication request using the secure sockets layer (SSL) or transport layer security (TLS) protocol. The listener component 126 can then forward the encrypted Kerberos authentication request to the KDC proxy 139. In other instances, the listener component 126 can instead encrypt the received Kerberos authentication request using the datagram TLS protocol or the datagram SSL protocol, and can forward the encrypted Kerberos authentication request directly to the KDC proxy 139 in order to avoid the additional overhead of wrapping the received Kerberos authentication request in a TCP stream and an HTTP request.

Upon receiving the Kerberos authentication request, the KDC proxy 139 can decrypt the received Kerberos authentication request. If necessary, the KDC proxy 139 can also unwrap the Kerberos authentication request from the HTTP request and TCP stream. For example, the KDC proxy 139 can extract the Kerberos authentication request from the body of the HTTP request or reconstruct the Kerberos authentication request from the TCP stream. The KDC proxy 139 can then forward the Kerberos authentication request to the KDC service 143. For example, the KDC proxy 139 can send a UDP packet including the Kerberos authentication request to the KDC service 143, as specified by the Kerberos protocol.

The KDC service 143 receives the Kerberos authentication request and either grants or denies the authentication request. The KDC server 143 then generates a Kerberos authentication response indicating the grant denial. The KDC service 143 then returns the Kerberos authentication response to the KDC proxy 139.

In response to receiving the Kerberos authentication response from the KDC service 143, the KDC proxy 139 can then process and forward the Kerberos authentication response to the listener component 126. To process the Kerberos authentication response, the KDC proxy 139 can, in some instances, wrap the Kerberos authentication response within a transmission control protocol (TCP) stream and a hypertext transport protocol (HTTP) response. The KDC proxy 139 can also encrypt the wrapped Kerberos authentication response using the secure sockets layer (SSL) or transport layer security (TLS) protocol. After processing the Kerberos authentication response, the KDC proxy 139 can then forward the encrypted Kerberos authentication response to the listener component 126. In other instances, the KDC proxy 139 can instead encrypt the received Kerberos authentication response using the datagram TLS protocol or the datagram SSL protocol. In these instances, the KDC proxy 139 can forward the encrypted Kerberos authentication response directly to the listener component 126 in order to avoid the additional overhead of wrapping the received Kerberos authentication response in a TCP stream and an HTTP request.

Upon receiving the Kerberos authentication response from the KDC proxy 139, the listener component 126 can then decrypt the received Kerberos authentication response. The listener component 126 can also unwrap the Kerberos authentication response from the HTTP request and TCP stream. Once the Kerberos authentication response has been decrypted or unwrapped, the listener component 126 can then forward the Kerberos authentication response to the Kerberos service 123.

Figure 2:
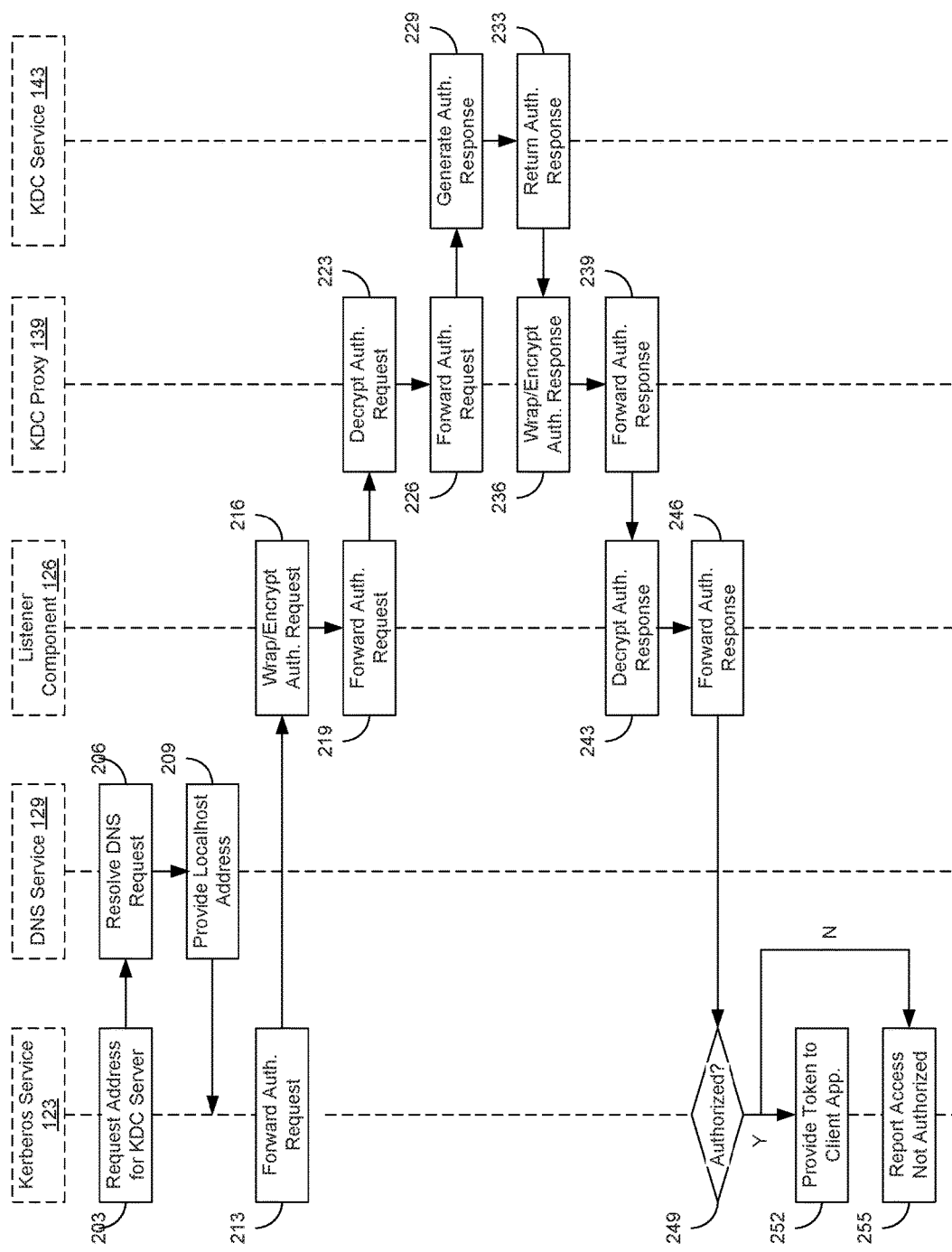
FIG. 2 is a sequence diagram depicting the interaction of various components.

Referring next to FIG. 2, shown is a sequence diagram that provides one example of the operation of portions of the Kerberos service 123, the listener component 126, the DNS service 131, the KDC proxy 139, and the KDC service 143. Here, the flow of Kerberos authentication requests and responses sent between the Kerberos service 123 and the KDC service 143 as they traverse the listener component 126 and the KDC proxy 139 is depicted. As an alternative, the sequence diagram of FIG. 2 can be viewed as depicting an example of elements of a method implemented in the networked environment of FIG. 1.

To begin, a client application 121 sends a request to a content service 127 for content 128. In response, the content service 127 can request that the client application 121 authenticate itself by providing a Kerberos token to the content service 127. However, if the client device 103 is not connected to the private network 119, the Kerberos service 123 may be unable to communicate with the KDC service 143 to obtain a Kerberos token. Accordingly, the following sequence of steps can be performed in order for a Kerberos token to be provided to the client application 121 through the use of the listener component 126.

Beginning at step 203, the Kerberos service 123 can generate a DNS request for the IP address of the authentication server 116 executing the KDC service 143. The DNS request can include the fully-qualified domain name of the authentication server 116 and potentially other data. The Kerberos service 123 can then send the DNS request to the DNS service 131.

Next, at step 206, the DNS service 131 resolves the DNS request received from the Kerberos service 123. To resolve the request, the DNS service 131 can query a DNS record 136 located in the DNS data store 133. Each DNS record 131 can represent a key-value pair, where a fully-qualified domain name corresponds to the key and an IP address corresponds to the value. For example, the DNS service can use the fully-qualified domain name of the authentication server 116 as the key to retrieve the IP address for the authentication server 116. In some instances, the DNS service 131 can recursively query other DNS services 131 associated with a parent domain of the authentication server 116 in order to retrieve the IP address of the authentication server 116.

Then, at step 209, upon resolving the DNS request, the DNS service 131 can provide the IP address corresponding to the fully-qualified domain name of the authentication server 116 to the Kerberos service 123. As previously discussed, the DNS record 136 will have been previously set to either the localhost IP address (for example, 127.0.0.1) or the publicly facing IP address for the client device 103 executing the Kerberos service 123. As a result, the Kerberos service 123 will forward Kerberos traffic to the listener component 126, as further described below in step 213.

Next, at step 213, the Kerberos service 123 can forward or otherwise send an authentication request to the listener component 126 executing on the same client device 103. Because the Kerberos service 123 has been told that the requested KDC service 143 is executing on the client device 103, the Kerberos service 123 can attempt to connect to the port that the Kerberos service 123 expects the KDC service 143 to be listening on. For example, if the Kerberos service 123 is attempting to communicate with the KDC service 143 using the Kerberos protocol, the Kerberos service 123 can attempt to connect to a KDC service 143 listening on port 88 of the client device 103 and can send a Kerberos authentication request to the listener component 126.

Then, at step 216, the listener component 126 can, in some instances, wrap the Kerberos authentication request within a transmission control protocol (TCP) stream and a hypertext transport protocol (HTTP) request, as previously described above. The listener component 126 can then encrypt the wrapped Kerberos authentication request using the secure sockets layer (SSL) or transport layer security (TLS) protocol. In other instances, the listener component 126 can instead encrypt the received Kerberos authentication request using the datagram TLS protocol or the datagram SSL protocol, and can forward the encrypted Kerberos authentication request directly to the KDC proxy 139 in order to avoid the additional overhead of wrapping the received Kerberos authentication request in a TCP stream and an HTTP request.

Next, at step 219, the listener component 126 can forward the encrypted Kerberos authentication request to the KDC proxy 139. The listener component 126 can be preconfigured with the location of the proxy server 109 executing the KDC proxy 139, for example, through the use of a profile setting, as previously described above.

Then, at step 223, the KDC proxy 139 can decrypt the received Kerberos authentication request. If the Kerberos authentication request has been wrapped within a TCP stream or an HTTP request, the KDC proxy 139 can also unwrap the Kerberos authentication request. For example, the KDC proxy 139 can extract the Kerberos authentication request from the body of the HTTP request. Next, at step 226, the KDC proxy 139 can then forward the Kerberos authentication request to the KDC service 143.

Then, at step 229, the KDC service 143 can generate a Kerberos authentication response. To generate the Kerberos authentication response, the KDC service 143 can first check to see if the user identifier in the Kerberos authentication request is valid (for example, the user identifier corresponds to an existing user). If the user identifier corresponds to an existing user, the KDC services 143 generates a session key encrypted using the secret key (for example, password or password based key) of the user and a ticket-granting-ticket (TGT) encrypted using the session key. In some instances, the session key and the ticket-granting-ticket can be sent as two separate responses, while in other instances, the session key and the ticket-granting-ticket can be sent as a single response. The term authentication response or Kerberos authentication response is used to refer to either instance. Next, at step 233, the KDC service 143 can return the generated Kerberos authentication response to the KDC proxy 139.

Then, at step 236, the KDC proxy 139 can, in some instances, wrap the Kerberos authentication response within a transmission control protocol (TCP) stream and a hypertext transport protocol (HTTP) response. For example, the KDC proxy 139 can include the Kerberos authentication response within the body of an HTTP response. The KDC proxy 139 can then encrypt the wrapped Kerberos authentication response using the secure sockets layer (SSL) or transport layer security (TLS) protocol. In other instances, the KDC proxy 139 can instead encrypt the received Kerberos authentication response using the datagram TLS protocol or the datagram SSL protocol and forward the encrypted Kerberos authentication response directly to the listener component 126 in order to avoid the additional overhead of wrapping the received Kerberos authentication response in a TCP stream and an HTTP request. Next, at step 239, the KDC proxy 139 can forward the encrypted Kerberos authentication response to the listener component 126.

Then, at step 243, the listener component 126 can decrypt the received Kerberos authentication response. If the Kerberos authentication response has been wrapped within a TCP stream or an HTTP request, the listener component 126 can also unwrap the Kerberos authentication response from the HTTP request and TCP stream.

Next, at step 246, the listener component 126 can forward the Kerberos authentication response to the Kerberos service 123. As a result, the Kerberos service 123 obtains a Kerberos authentication token, which can be used to authenticate the client application 121 or the client device 103 with other network services.

Moving on to step 249, the Kerberos service 123 analyzes the response forwarded from the listener component 126 to determine whether the client application on behalf of which the Kerberos request was made has been authorized by the KDC service 143. For example, if the Kerberos service 123 determines that the response includes a Kerberos token, then the Kerberos service 123 can determine that the client application is authorized. In this case, the process proceeds to step 252, where the Kerberos service 123 provides the Kerberos token to the client application 121 in order to allow the client application 121 to access the content service 127. Likewise, if the Kerberos service 123 determines that the response fails to include a Kerberos token, then the Kerberos service 123 can determine that the client application is unauthorized. In this case, the process skips to step 255, where the Kerberos service 123 reports to the client application 121 that the client application is unauthorized to access the content service 127.

Figure 3:
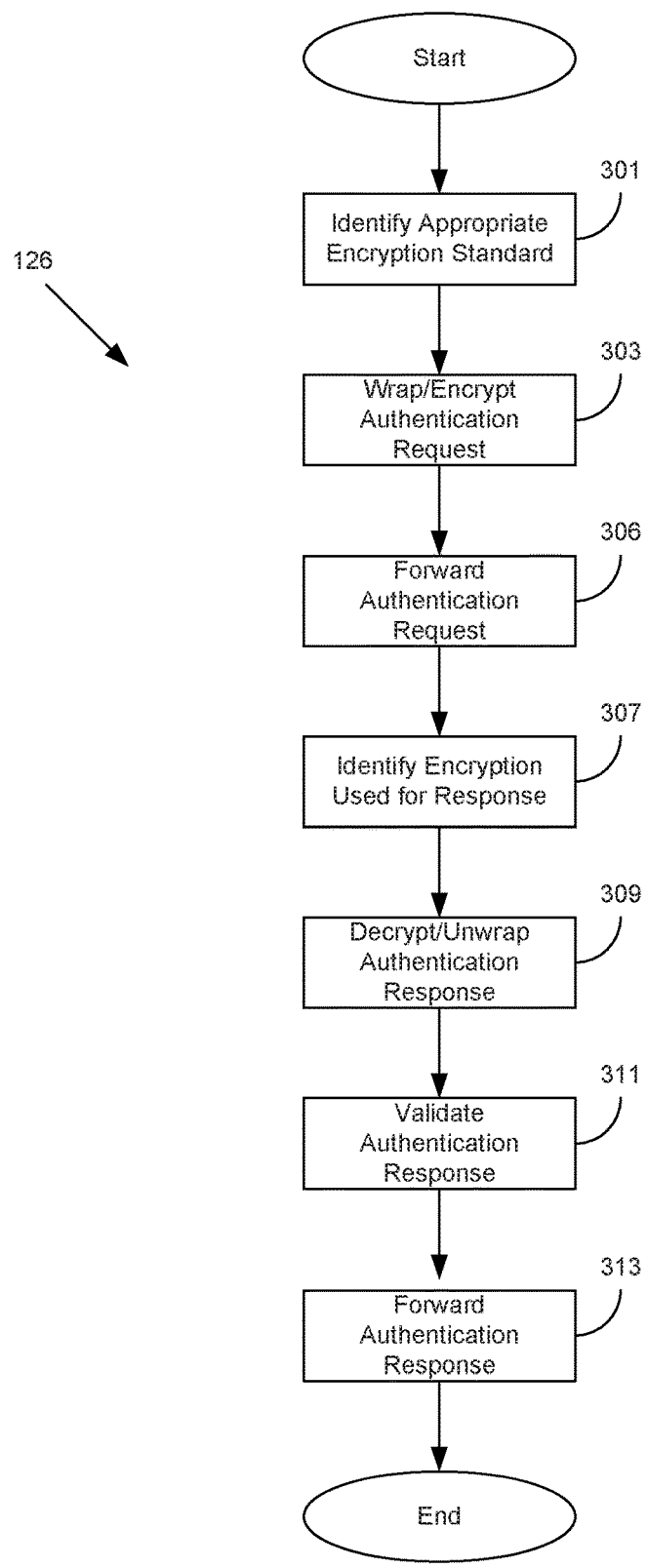
FIG. 3 is a flowchart depicting the operation of an application.

Referring next to FIG. 3, shown is a flowchart that provides one example of the operation of a portion of the listener component 126. Here, the steps performed by the listener component 126 to intercept and relay Kerberos traffic on behalf of a Kerberos service 123 are described. As an alternative, the flowchart of FIG. 3 can be viewed as depicting an example of elements of a method implemented in the networked environment of FIG. 1.

Beginning with step 301, the listener component 126 optionally identifies the encryption standard to be used for encrypting requests and decrypting responses. In many instances, the encryption algorithm to be used will be negotiated when the connection between the listener component 126 and the KDC proxy 139 is established by the provider of the secure sockets layer (SSL) or transport layer security (TLS) protocol for the listener component 126. The algorithm to be selected will be based at least in part on which versions of the SSL or TLS protocol are supported by the listener component 126 and the KDC proxy 139 and which encryption algorithms are supported by the listener component 126 and the KDC proxy 139. However, the listener component 126 may provide an indication to the library implementing the SSL or TLS protocol that certain algorithms are preferred.

Then at step 303, the listener component 126 can wrap a Kerberos authentication request received from the Kerberos service 123 within a transmission control protocol (TCP) stream and a hypertext transport protocol (HTTP) request. For example, the listener component 126 can include the Kerberos authentication request within the body of an HTTP request. The listener component 126 can then encrypt the wrapped Kerberos authentication request using the secure sockets layer (SSL) or transport layer security (TLS) protocol. In other instances, the listener component 126 can instead encrypt the received Kerberos authentication request using the datagram TLS protocol or the datagram SSL protocol and forward the encrypted Kerberos authentication request directly to the KDC proxy 139 in order to avoid the additional overhead of wrapping the received Kerberos authentication request in a TCP stream and an HTTP request.

Next, at step 306, the listener component 126 can forward, send, or otherwise provide the wrapped and encrypted Kerberos authentication request to the KDC proxy 139. For example, the listener component 126 can make a system call to the network stack provided by the operating system to establish a connection to the KDC proxy 139 and provide the wrapped and encrypted Kerberos authentication request to the connection. The listener component 126 can be preconfigured with the appropriate IP address of the KDC proxy 139, for example, by specifying an IP address or fully-qualified domain name of the KDC proxy 139 in an application setting for the listener component 126. In some instances, the value for the application setting can be specified in a device profile for the client device 103. For example, a management service can send a device profile to the client device 103 that specifies the IP address or domain name of the KDC proxy 139, as previously described above.

Proceeding to step 307, the listener component 126 determines the encryption used for the response. For example, the SSL or TLS library used to encrypt the connection between the listener component 126 and the KDC proxy 139 will have negotiated a particular encryption algorithm per the SSL or TLS protocol.

Then, at step 309, the listener component 126 can decrypt a Kerberos authentication response relayed to the listener component 126 by the KDC proxy 139. In some instances, the listener component 126 can also unwrap the Kerberos authentication response. For example, if the Kerberos authentication response is encrypted using SSL or TLS and embedded within an HTTP response and a TCP stream, the listener component 126 can reassemble the HTTP response from the TCP stream. The listener component 126 can then decrypt the HTTP response. After decrypting the HTTP response, the listener component 126 can then extract the Kerberos authentication response from the body of the HTTP response. However, if the Kerberos authentication response is merely encrypted (for example, using the datagram SSL or datagram TLS protocol), the listener component 126 can then just decrypt the Kerberos authentication response.

Proceeding to step 311, the listener component 126 optionally validates the authentication response. Although the SSL and the TLS protocol includes functionality that uses digital signatures to determine whether a third party is tampering with an encrypted connection, the listener component 126 can perform additional validation to confirm that the authentication response was not altered prior to transmission. For example, the authentication response could include a digital signature for a Kerberos token. The listener component 126 could compute the digital signature of the Kerberos token and compare it to the digital signature included in the authentication response to further verify the authentication response.

Next, at step 313, upon decrypting or unwrapping the Kerberos authentication response, the listener component 126 can forward the Kerberos authentication response to the Kerberos service 123 that generated the corresponding Kerberos authentication request. For example, the listener component 126 could use one or more interprocess communications methods provided by the operating system to send the Kerberos authentication response (e.g., a file or memory mapped file mutually accessible to the listener component 126 and the Kerberos service 123, a pipe or named pipe between the listener component 126 and the Kerberos service 123, a socket, a message passing application programming interface (API), a semaphore, or similar interprocess communications function). As a result, the Kerberos service 123 obtains a Kerberos authentication token, which can be used to authentication the client application 121 or the client device 103 with other network services.

Figure 4:
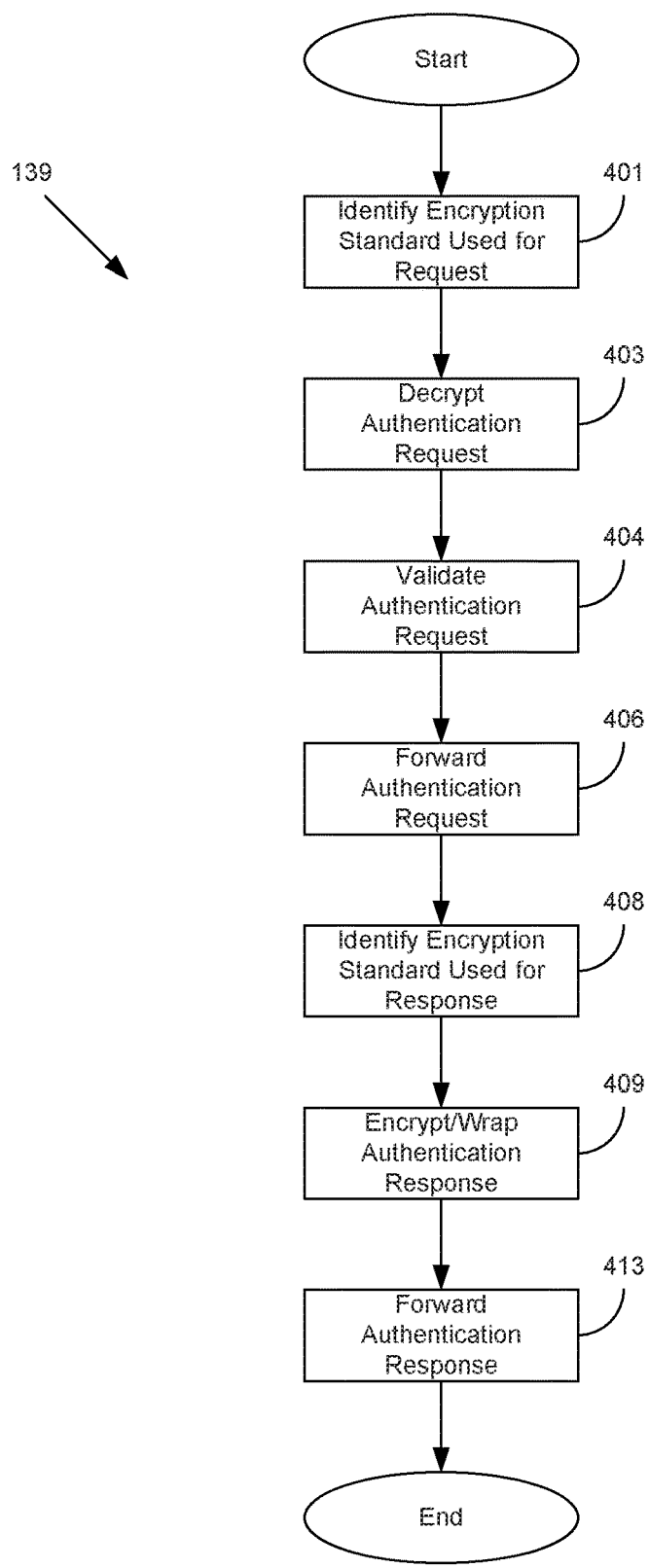
FIG. 4 is another flowchart depicting the operation of an application.

Referring next to FIG. 4, shown is a flowchart that provides one example of the operation of a portion of the KDC proxy 139. Here, the steps performed by the KDC proxy 139 as it relays Kerberos requests and responses between the listener component 126 and the KDC service 143 are described. As an alternative, the flowchart of FIG. 4 can be viewed as depicting an example of elements of a method implemented in the networked environment of FIG. 1.

Beginning with step 401, the KDC proxy 139 optionally identifies the encryption standard to be used for encrypting responses and decrypting requests. In many instances, the encryption algorithm to be used will be negotiated when the connection between the listener component 126 and the KDC proxy 139 is established by the provider of the secure sockets layer (SSL) or transport layer security (TLS) protocol for the KDC proxy 139. The algorithm to be selected will be based at least in part on which versions of the SSL or TLS protocol are supported by the listener component 126 and the KDC proxy 139 and which encryption algorithms are supported by the listener component 126 and the KDC proxy 139. However, the KDC proxy 139 may provide an indication to the library implementing the SSL or TLS protocol that certain algorithms are preferred.

Then at step 403, the KDC proxy 139 can decrypt or unwrap a Kerberos authentication request sent to the KDC proxy 139 by a listener component 126 executing on a client device 103. For example, if the Kerberos authentication request is encrypted using SSL or TLS and embedded within an HTTP response and a TCP stream, the KDC proxy 139 can first reassemble the HTTP response from the TCP stream. The KDC proxy 139 can then decrypt the HTTP response. Upon decrypting the HTTP response, the KDC proxy 139 can then extract the Kerberos authentication response from the body of the HTTP response. However, if the Kerberos authentication response is merely encrypted (for example, using the datagram SSL or datagram TLS protocol), the KDC proxy 139 can then just decrypt the Kerberos authentication response.

Next at step 404, the KDC proxy 139 optionally validates the authentication request. Although the SSL and the TLS protocol includes functionality that uses digital signatures to determine whether a third party is tampering with an encrypted connection, the KDC proxy 139 can perform additional validation to confirm that the authentication response was not altered prior to transmission. For example, the authentication request could include a digital signature for a Kerberos token. The the KDC proxy 139 could compute the digital signature of the authentication request and compare it to the digital signature included in the authentication request to further verify the authentication request.

Then, at step 406, the KDC proxy 139 forwards the decrypted Kerberos authentication request to the KDC service 143. For example, the KDC proxy 139 can make a system call to the network stack provided by the operating system to establish a connection to the KDC service 143 and provide the wrapped and encrypted Kerberos authentication request to the connection. The KDC proxy 139 can be preconfigured with the address of the KDC service 143 to which Kerberos authentication requests are to be forwarded.

Proceeding to step 408, the KDC proxy 139 optionally identifies the encryption standard to be used for encrypting the authentication response to be sent to the listener component 126. In many instances, the encryption algorithm to be used will be negotiated when the connection between the listener component 126 and the KDC proxy 139 is established by the provider of the secure sockets layer (SSL) or transport layer security (TLS) protocol for the KDC proxy 139. The algorithm to be selected will be based at least in part on which versions of the SSL or TLS protocol are supported by the listener component 126 and the KDC proxy 139 and which encryption algorithms are supported by the listener component 126 and the KDC proxy 139. However, the KDC proxy 139 may provide an indication to the library implementing the SSL or TLS protocol that certain algorithms are preferred.

Next at step 409, the KDC proxy 139 can, in some instances, wrap a Kerberos authentication response received from the KDC service 143 within a transmission control protocol (TCP) stream and a hypertext transport protocol (HTTP) response. For example, the KDC service 143 can include the Kerberos authentication response within the body of an HTTP response. The KDC proxy 139 can then encrypt the wrapped Kerberos authentication request using the secure sockets layer (SSL) or transport layer security (TLS) protocol. In other instances, the KDC proxy 139 can instead encrypt the received Kerberos authentication request using the datagram TLS protocol or the datagram SSL protocol and forward the encrypted Kerberos authentication response directly to the listener component 126 in order to avoid the additional overhead of wrapping the received Kerberos authentication request in a TCP stream and an HTTP response.

Then, at step 413, the KDC proxy 139 can forward or otherwise return or relay the encrypted Kerberos authentication response to the respective listener component 126 on the client device 103. For example, the KDC proxy 139 can make a system call to the network stack provided by the operating system to establish a connection to the listener component 126. The KDC proxy 139 can then provide the wrapped and encrypted Kerberos authentication response to the connection. As a result, the listener component 126 can receive and then forward the Kerberos authentication response to the Kerberos service 123, allowing the Kerberos service 123 to use Kerberos to authenticate with the KDC service 143.

The sequence diagram of FIG. 2 and the flowcharts of FIGS. 3 and 4 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram and flowchart of FIGS. 2-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The client device 103, DNS server 106, the proxy server 109, and the authentication server 116, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The Kerberos service 123, the listener component 126, the DNS service 131, the KDC proxy 139, the KDC service 143, and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

The invention claimed is:

1. A system, comprising:
a computing device comprising a processor, a memory, and a network interface;
an application comprising machine-readable instructions stored in the memory that, when executed by the processor, cause the computing device to at least:
receive a Kerberos authentication request from a Kerberos service executing on the computing device, the Kerberos authentication request specifying an internet protocol (IP) address of the computing device as an address for a Kerberos key distribution center (KDC) service;
encrypt the Kerberos authentication request to generate an encrypted Kerberos authentication request; and
forward the Kerberos encrypted authentication request to a reverse proxy server.

2. The system of claim 1, wherein the application further causes the computing device to at least decrypt an authentication response received from the reverse proxy server.

3. The system of claim 2, wherein the application further causes the computing device to at least provide the decrypted authentication response to the Kerberos service executing on the computing device.

4. The system of claim 1, wherein the application further causes the computing device to at least embed the authentication request within a transmission control protocol (TCP) stream.

5. The system of claim 1, wherein the application further causes the computing device to at least wrap the authentication request within a request encoded according to a version of the hypertext transport protocol (HTTP).

6. The system of claim 1, wherein the authentication request is encrypted according to a version of the secure sockets layer (SSL) protocol or the transport layer security (TLS) protocol.

7. The system of claim 1, wherein the authentication request complies with a version of the Kerberos protocol.

8. A method, comprising:
receiving, by a computing device, a Kerberos authentication request from a Kerberos service executing on the computing device, the Kerberos authentication request specifying an internet protocol (IP) address of the computing device as an address for a Kerberos key distribution center (KDC) service
encrypting, by the computing device, the Kerberos authentication request to generate an encrypted Kerberos authentication request; and
forwarding, by the computing device, the encrypted Kerberos authentication request to a reverse proxy server.

9. The method of claim 8, further comprising decrypting, by the computing device, an authentication response received from the reverse proxy server.

10. The method of claim 9, further comprising providing the decrypted authentication response to the Kerberos service executing on the computing device.

11. The method of claim 8, further comprising embedding, by the computing device, the authentication request within a transmission control protocol (TCP) stream.

12. The method of claim 8, further comprising wrapping, by the computing device, the authentication request within a request encoded according to a version of the hypertext transport protocol (HTTP).

13. The method of claim 8, wherein the authentication request is encrypted according to a version of the secure sockets layer (SSL) protocol or the transport layer security (TLS) protocol.

14. The method of claim 8, wherein the authentication request complies with a version of the Kerberos protocol.

15. A non-transitory computer readable medium comprising machine readable instructions that, when executed by a processor of a computing device, cause the computing device to at least:
receive a Kerberos authentication request from a Kerberos service executing on the computing device, the Kerberos authentication request specifying an internet protocol (IP) address of the computing device as an address for a Kerberos key distribution center (KDC) service;
encrypt the Kerberos authentication request to generate an encrypted Kerberos authentication request; and
forward the encrypted Kerberos authentication request to a reverse proxy server.

16. The non-transitory computer readable medium of claim 15, wherein the machine readable instructions further cause the computing device to at least decrypt an authentication response received from the reverse proxy server.

17. The non-transitory computer readable medium of claim 16, wherein the machine readable instructions further cause the computing device to provide the decrypted authentication response to the Kerberos service executing on the computing device.

18. The non-transitory computer readable medium of claim 15, wherein the machine readable instructions further cause the computing device to at least embed the authentication request within a transmission control protocol (TCP) stream.

19. The non-transitory computer readable medium of claim 15, wherein the machine readable instructions further cause the computing device to at least wrap the authentication request within a request encoded according to a version of the hypertext transport protocol (HTTP).

20. The non-transitory computer readable medium of claim 15, wherein the authentication request is encrypted according to a version of the secure sockets layer (SSL) protocol or the transport layer security (TLS) protocol.

* * * * *